United States Patent
Koike

(10) Patent No.: US 6,366,981 B1
(45) Date of Patent: Apr. 2, 2002

(54) DISC ARRAY APPARATUS HAVING A PRESUPPOSED RESPONSE TIME AND A NUMBER OF DISC UNITS

(75) Inventor: Hirohiko Koike, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/205,711

(22) Filed: Dec. 4, 1998

(30) Foreign Application Priority Data

Dec. 5, 1997 (JP) .............................................. 9-335431

(51) Int. Cl.$^7$ .............................................. G06F 12/00
(52) U.S. Cl. ........................ 711/114; 711/112; 711/167
(58) Field of Search ................................ 714/7, 12, 13, 714/42; 711/114, 112, 111, 167

(56) References Cited

U.S. PATENT DOCUMENTS

| | | | | |
|---|---|---|---|---|
| 5,249,279 A | * | 9/1993 | Schmenk et al. | ........... 395/425 |
| 5,450,609 A | * | 9/1995 | Schultz et al. | ............. 395/800 |
| 5,479,653 A | * | 12/1995 | Jones | ..................... 395/182.03 |
| 5,694,581 A | * | 12/1997 | Cheng | .......................... 395/500 |
| 5,761,526 A | * | 6/1998 | Sakakura et al. | ........... 395/821 |
| 5,875,457 A | * | 2/1999 | Shalit | .......................... 711/114 |
| 6,023,780 A | * | 2/2000 | Iwatani | ........................ 714/770 |
| 6,061,761 A | * | 5/2000 | Bachmat | ...................... 711/114 |
| 6,088,766 A | * | 7/2000 | Bachmat et al. | ............ 711/114 |
| 6,237,063 B1 | * | 5/2001 | Bachmat et al. | ............ 711/114 |

* cited by examiner

Primary Examiner—Matthew M. Kim
Assistant Examiner—Stephen Elmore
(74) Attorney, Agent, or Firm—McGinn & Gibb, PLLC

(57) ABSTRACT

A disc array apparatus, having a presupposed response time, that includes several disc units for storing data transmitted from a host apparatus and an array controller for controlling a data transfer between disc units and the host apparatus. The array controller has a performance detector for detecting response times of the disc units, a correction value generator for calculating a correction value based on a difference between the response time detected for each of the disc units and a reference value, and a response timing corrector for correcting a time value at which an access end report is sent to the host apparatus at the presupposed response time, using the correction value.

13 Claims, 3 Drawing Sheets

DISC ARRAY APPARATUS HAVING A PRESUPPOSED RESPONSE TIME AND A NUMBER OF DISC UNITS

BACKGROUND OF THE INVENTION

1. Field of the Invention

The present invention relates to a disc array apparatus and in particular, to a disc array apparatus capable of coping with a difference in access performance of disc (or disk) units (DKU) constituting a disc array of the disc array apparatus.

2. Description of the Related Art

A disc array apparatus has a performance characteristic greatly affected by performance characteristics of physical disc units (DKU) involved in the disc array. However, it is preferable that a disc array apparatus have a constant performance characteristic not affected by the physical disc units. Conventionally, a disc array apparatus has used disc units having similar performance characteristics.

These years, however, a SCSI (small computer system interface) disc apparatus has begun to be used. The SCSI disc apparatus has been rapidly improving its performance characteristics. Such a physical disc apparatus has a short life cycle on the market and can be used only for a short period of time. That is, for the disc array apparatus, a countermeasure should be taken to cope with a difference in the performance among the disc apparatus units involved in the array.

In a conventional disc array apparatus, when a disc unit is to be replaced with a new one, it is difficult to find a disc apparatus having the performance presupposed by the disc array apparatus. Accordingly, it is not easy to add a physical disc unit in an array.

That is, it is difficult to prepare a plurality of physical disc units having an identical performance. When a disc unit is to be added or modified, the disc array apparatus has a problem in maintaining a constant data access with respect to a host apparatus.

SUMMARY OF THE INVENTION

It is therefore an object of the present invention to provide a disc array apparatus capable of maintaining a constant performance characteristic as a disc array apparatus even if a disc unit having a different performance is added or if a disc unit is modified to have a different performance.

The disc array apparatus according to the present invention comprises a plurality of disc units for storing a data transmitted from a host apparatus, and an array controller for controlling upon an access from the host apparatus a data transfer between the disc units and the host apparatus, the array controller including: a performance detector for detecting performance values of the plurality of disc units; a correction value generator for calculating a correction value based on a difference between the performance value detected for each of the disc units and a predetermined reference performance value; and a response timing corrector for correcting a timing at which a data transfer end report is to be sent to the host apparatus using the correction value obtained by the correction value generator.

In the disc array apparatus, the performance detector determines a performance characteristic for each of the disc units involved. The performance characteristic includes a response speed for an access, for example. Furthermore, the correction value generator compares a value actually measured to a reference value as a value presupposed by the array controller to obtain a difference as a correction value.

In general, after a disc array apparatus is implemented for use, a higher-speed disc unit is developed. When such a higher-speed disc unit is mounted on the disc array apparatus, the correction value generator generates a correction value comparing the reference value of the disc array apparatus to an actually obtained performance value. Next, the response timing corrector, when an access is made from the host apparatus, delays a data transfer end report to the host apparatus until a timing based on the correction value. That is, for the host apparatus, a data transfer appears to be carried out with a response time presupposed by the disc array apparatus.

DESCRIPTION OF THE PREFERRED EMBODIMENTS

Description will now be directed to an embodiment of the present invention with reference to the attached drawings.

Figure 1:
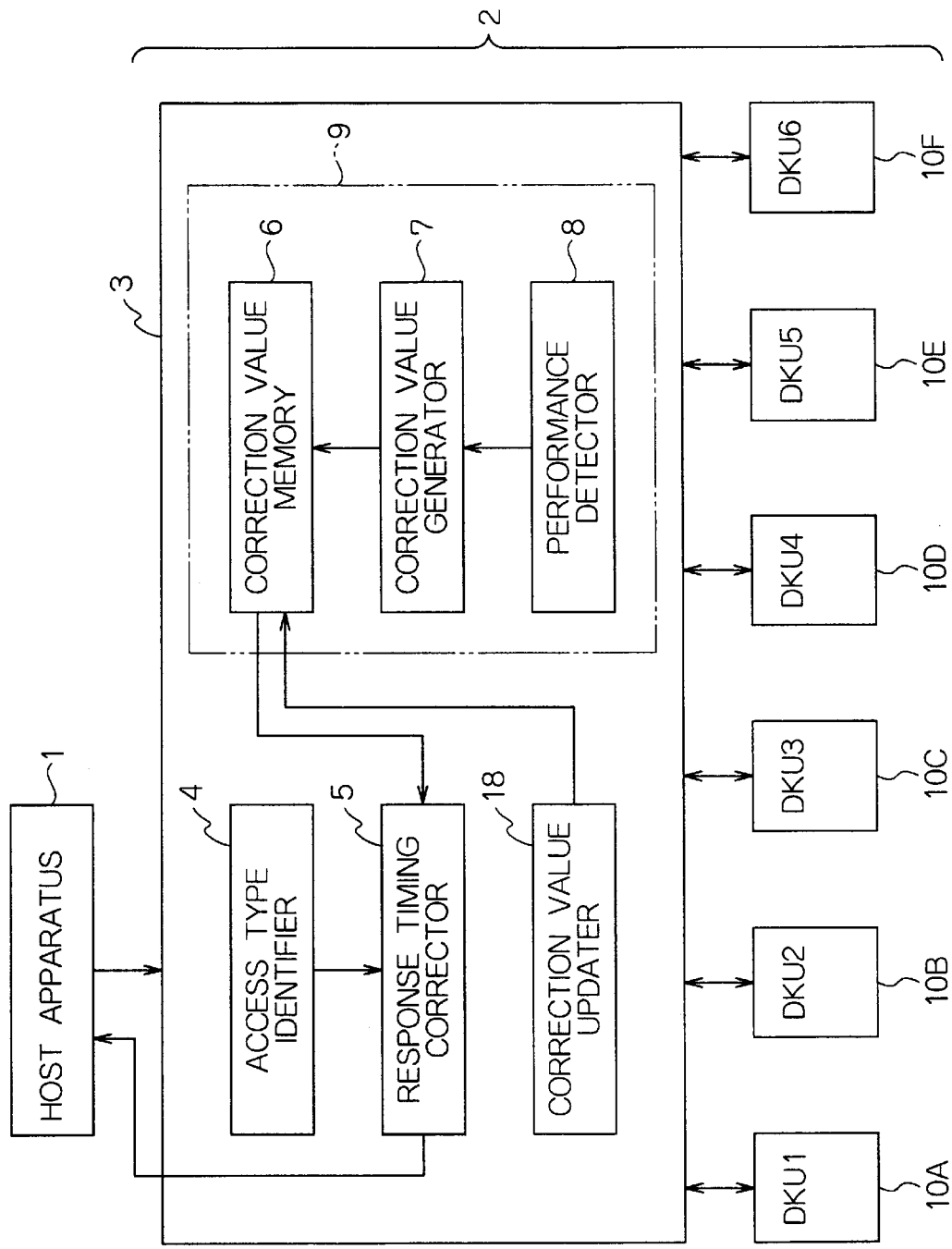
FIG. 1 is a block diagram showing a configuration of a disc array apparatus according to an embodiment of the present invention.

FIG. 1 is a block diagram showing a disc array apparatus according to the embodiment of the present invention. As shown in FIG. 1, the disc array apparatus 2 according to the embodiment of the present invention comprises a plurality of disc units (DKU1 to DKU6) 10A to 10F for storing a data transmitted from a host apparatus 1 and a disc array controller (array controller) 3 for controlling the plurality of disc units 10. The array controller 3 includes: a performance detector 8 for checking performance of the disc units 10; correction value generator 7 for comparing a predetermined reference value to a performance of a disc unit 10 detected by the performance detector 8, so as to obtain a difference and create a correction value from the difference; and response timing corrector 5 used upon access from the host apparatus, for correcting the timing of an end report to the host apparatus 1 using the correction value calculated by the correction value generator 7.

In a case of a new disc unit 10 having a high performance, the response timing corrector 5 uses a correction value to delay timing of an end report to be sent to the host apparatus upon completion of a data transfer, so that the disc array apparatus 2 can have an identical performance with respect to the host apparatus.

The performance detector 8, the correction value generator 7, and the response timing corrector can be implemented as logical circuits such as an LSI. The array controller may comprise a microprocessor and a ROM containing a program for performance detection for example, so as to execute the program for the function of the correction value generator 7.

The array controller 3 may have any configuration if it can cause the same operation as the components shown in FIG. 1.

Moreover, It is preferable that the array controller 3 further include correction value memory 6 for storing correction values for the respective disc units calculated by the correction value generator 7; and a correction value update device, when a disc unit 10 is re-connected to the array controller, for deleting a disc unit correction value from the correction value memory 6 and activate the performance detector 8. That is, when a connection is made between a new disc unit and the disc array apparatus, is connected, the correction value previously used need be updated. For this, the correction value update device 18 deletes a correction value which has been used and activates the performance detector 8. The performance detector 8 determines the performance of the new disc unit connected. According to the performance detected, the correction value generator 7 calculates a correction value for the new disc unit connected. Thus, the correction value is updated.

Moreover, it is also possible to calculate a correction value by determining a performance for each of the access types. Moreover, the correction value may not be based on an actually measured value but determined according to a type or format of the respective disc units. In this embodiment, the array controller 3 comprises an access type identification device 4 for identifying an access type when an access is made from the host apparatus; a correction value identification device 9 for identifying a response timing correction value for each of the access types identified by the access type identification device 4; and a response timing correction device for delaying an end report for the access until the response timing is corrected with the correction value identified by the correction time identification device 9. As shown in FIG. 1, the correction value identification device 9 may include a correction value memory 6, a correction value generator 7, and a performance detector. However, the correction value identification device 9 may include a device supplied with a performance value determined for each of the formats of the disc units and a device for calculating a correction value based on the performance value supplied. Moreover, it is also possible that a correction value is directly supplied.

Furthermore, the array controller may comprise a performance detector 8 for determining the performance of the disc unit 10 according to the access type identified by the access type identification device 4; and a correction value generator 7 for generating a correction value to compensate a performance difference between disc units according to the value determined by the performance detector 8 in combination with a predetermined reference value. In this case, the performance detector 8 and the correction value generator 7 calculate a correction value for each access type and accordingly, it is possible to correct the response timing according to the respective access types from the host apparatus.

The response time corrector 5 delays an data transfer end report caused by an access from the host apparatus until the response timing defined by the correction value calculated by the correction value generated according to the access type identified by the access type identifier. Thus, the response timing can be corrected according to the access type, enabling to maintain a consistent response speed to the host apparatus when a new disc unit is connected to the array controller.

Next, explanation will be given on the operation according to the present embodiment. When the performance detector 8 detects that the array controller is connected to a disc unit 10 having no correction value loaded in the correction value memory 6, the performance detector 8 checks the performance characteristic of the disc unit 10. Accordingly, when a new disc array apparatus is implemented, all the disc units are subjected to performance check. Upon completion of this check, the check result is passed to the correction value generator 7. The correction value generator 7 compares the check result with a reference value so as to calculate a performance correction value of this physical disc unit, and passes a calculation result to the correction value memory 6.

The correction value memory 6 stores the correction value of the disc unit 10. When the physical disc unit 10 is removed or reconnected, the correction value updater 18 invalidates the correction value stored in the correction value memory 6 and activates the performance detector 8.

When an I/O is received from a host apparatus, the array controller 3 identifies a physical disc unit 10 to which this access is made. Next, the access type identifier 4 identifies an access type and passes the access type to the response timing corrector. The response timing corrector 5, upon reception of an end report from the disc unit 10, sends the end report to the host apparatus at the timing determined according to the correction value. Thus, even when a different type of physical disc unit is mounted, the access performance from a host apparatus can be maintained consistent.

Next, explanation will be given on some examples of the present embodiment.

Figure 2:
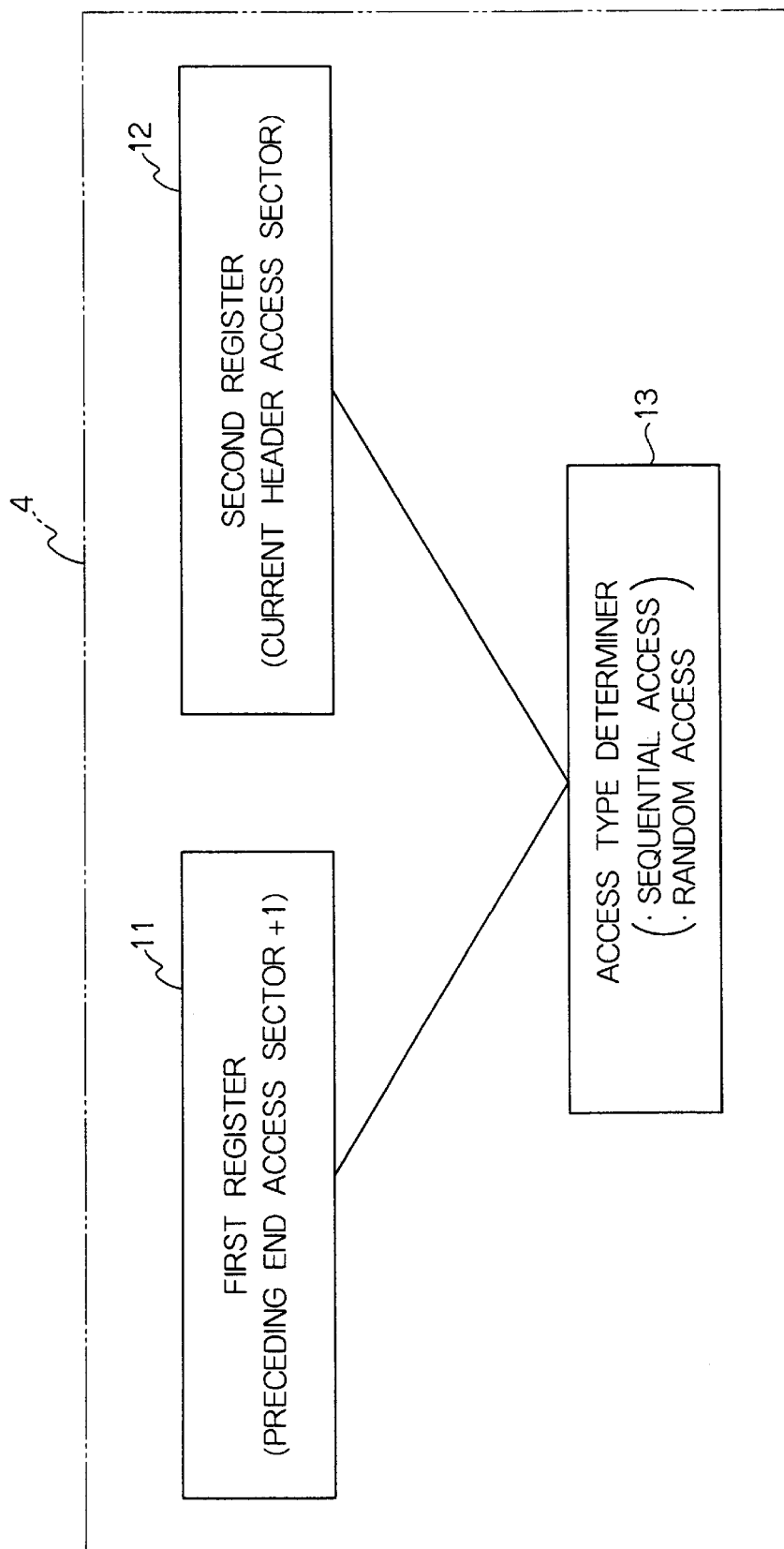
FIG. 2 is a block diagram showing a configuration example of an access type identification device shown in FIG. 1.

The access type identifier 4 may includes an address memory for storing an access address, and an access continuity detector for determining whether an access is sequential or random by referencing a preceding access address stored in the address memory. More specifically, as shown in FIG. 2, the access type identifier 4 preferably includes a first register 11 for retaining a preceding access end sector address incremented by 1; a second register 12 for retaining a current access header sector address; and an access type determiner 13 for identifying an access type, i.e., sequential or random access, according to these two addresses supplied from the first register 11 and the second register 12.

Figure 3:
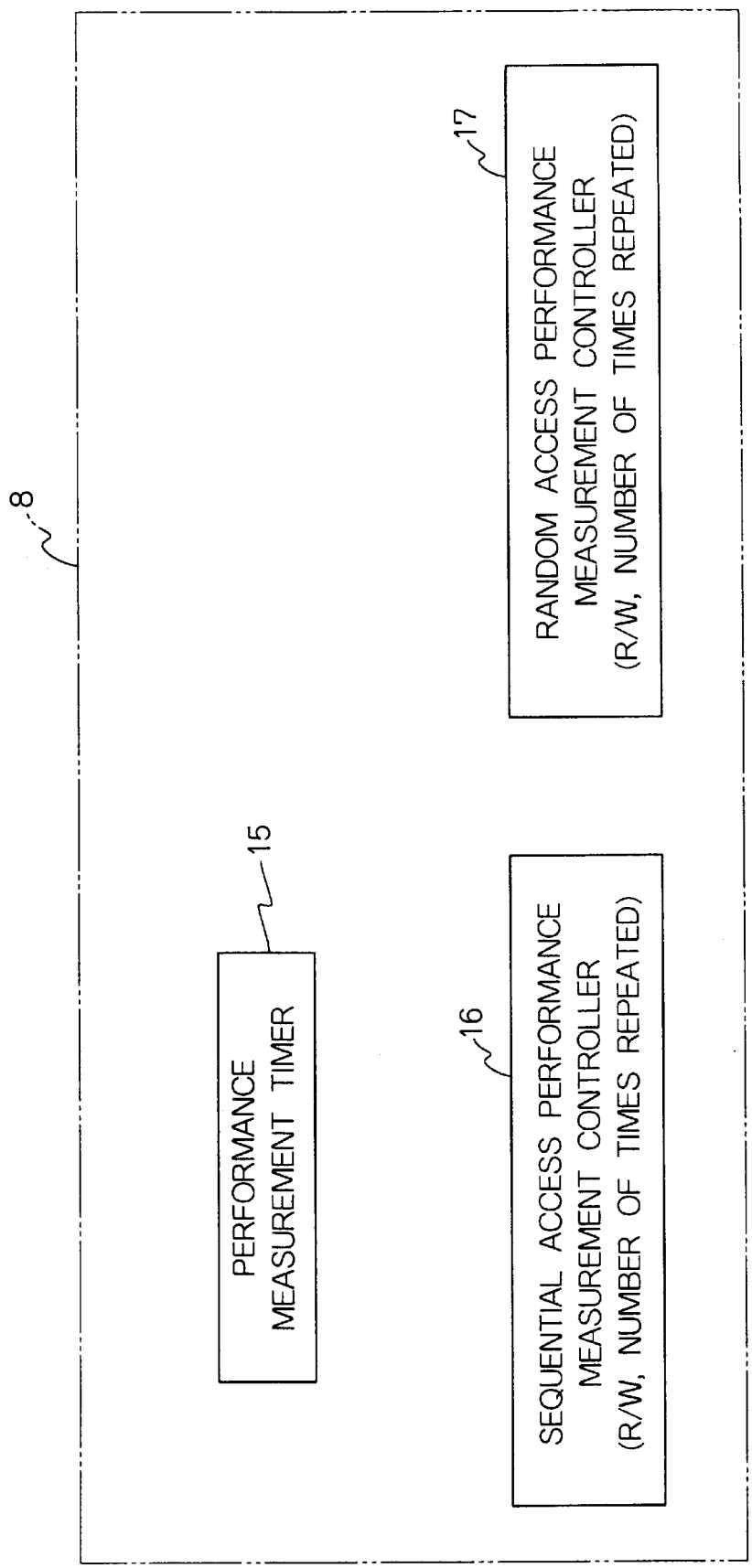
FIG. 3 is a block diagram showing a configuration example of a performance detector shown in FIG. 1.

FIG. 3 is a block diagram showing a configuration of the performance detector 8. The performance detector 8 includes: a timer 15 for measuring a performance; a sequential access performance measurement controller 16; and a random access performance measurement controller 17.

Firstly, if a disk unit 10 having no correction value loaded in the correction memory 6 is detected, the performance detector 8 checks the performance characteristic of the disc unit 10. The performance detector 8 includes the timer 15 for measurement, the sequential access performance measurement controller 16, and the random access performance measurement controller 17. The sequential repeats a sequential READ test and a sequential WRITE test a specified number of times to calculate an average value. That random access performance measurement controller 17 repeats a random READ test and a random WRITE test a specified number of times to calculate an average value.

When this check is complete, the check result is passed to the correction value generator 7. The correction value generator 7 compares the check result to a reference value to calculate a correction value of this physical disc unit and passes the calculation result to the correction value memory 6. The correction value memory 6 stores the correction value.

When an I/O is received from a host apparatus, the array controller 8 identifies a physical disc unit 10 to which the access is made. When the disc unit 10 is identified, the access type identifier 4 identifies the access type to this physical disc unit 10.

The access type identifier 4 includes the first register 1 and the second register 2 for each of the physical disc units 10. The first register 1 contains a preceding access sector incremented by 1, whereas the second register 2 contains a current header access sector. Accordingly, if the value of the first register is equal to the value of the second register, the access is determined to be sequential. Next, the access type identified is passed to the response timing corrector 5.

The array controller 3 then activates the physical disc unit 10. The response timing corrector 5, upon reception an end report form the disc unit 10, sends an end report to a host apparatus at a timing corrected by a correction value according to an access type. Thus, even if different types of physical disc units are mounted, it is possible to obtain a consistent access performance characteristic from the host apparatus.

As has been described above, in this example, the disc array apparatus generates a correction value for each of the disc units, so as to be used to compensate the access performance of a host apparatus. Consequently, the disc array apparatus constituted by a different types of disc units 10 can obtain a consistent access performance from the host apparatus.

In the disc array apparatus according to the present invention having the aforementioned configuration, a correction value is generated from an actual performance with a reference value, i.e., a disc unit performance presupposed by the disc array apparatus, so that the response timing corrector can send at an appropriate timing a data transfer end report to a host apparatus which has made an access. Accordingly, for the host apparatus, a data transfer appears to be carried out with the response timing presupposed by the disc array apparatus. This enables to connect a new high-performance disc unit to the disc array apparatus without causing any problem.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 09-335431 (Filed on Dec. $5^{th}$, 1997) including specification, claims, drawings and summary are incorporated herein by reference in its entirety.

What is claimed is:

1. A disc array apparatus having a presupposed response time for an access and including a plurality of disc units for storing data transmitted from a host apparatus and an array controller for controlling upon an access from the host apparatus the data transfer between the disc units and the host apparatus, the array controller comprising:

a performance detector for detecting a response time for an access of each of the plurality of disc units;

a correction value generator for calculating a correction value based on a difference between the response time for an access detected for each of the disc units and a predetermined reference value; and a response timing corrector for correcting a time value at which an access end report is sent to the host apparatus at the presupposed response time of the disc array apparatus, using the correction value obtained by the correction value generator.

2. A disc array apparatus as claimed in claim 1, wherein the array controller further includes:

a correction value memory for storing the correction value calculated by the correction value generator for each of the disc units, and a correction value updater used when one of the disc units is removed and reconnected to the disc array apparatus, for deleting the correction value of that disc unit from the correction value memory and activating the performance detector.

3. A method of operation of a disc array apparatus having a presupposed response time for an access and including a plurality of disc units for storing data transmitted from a host apparatus and an array controller for controlling upon access from the host apparatus the data transfer between the disc units and the host apparatus, the method comprising:

detecting a response time of an access of the plurality of disc units;

calculating a correction value based on a difference between the response time of an access detected for each of the disc units and a predetermined reference value; and providing a time value at which an access end report is sent to the host apparatus at the presupposed response time of the disc array apparatus, using the correction value obtained by the correction value generator.

4. A method of operation of a disc array apparatus as claimed in claim 3, wherein the array controller includes a correction value memory for storing a correction value calculated for each of the disc units, the method comprising:

deleting the correction value of the disc unit from the correction value memory when one or more of the disc units is removed and reconnected to the array controller, checking a response time of an access of the disc unit reconnected, and calculating a correction value based on the response time of an access obtained and storing the correction value in the correction value memory.

5. A disc array apparatus having a presupposed response time for an access and including a plurality of disc units for storing data transmitted from a host apparatus and an array controller for controlling upon an access from the host apparatus a data transfer between the disc units and the host apparatus, the array controller comprising:

response time of an access detecting means for detecting the response times of an access of the plurality of disc units;

correction value generating means for calculating a correction value based on a difference between the response time for an access detected for each of the disc units and a predetermined reference value; and response timing correcting means for correcting a time value at which an access end report is sent to the host apparatus at the presupposed response time of the disc array apparatus, using the correction value obtained by the correction value generator.

6. A disc array apparatus as claimed in claim 5, wherein the array controller further includes:

correction value storing means for storing the correction value calculated by the correction value generator for each of the disc units, and correction value updating means used when one of the disc units is removed and reconnected to the disc array apparatus, for deleting the correction value of that disc unit from the correction value memory and activating the performance detector.

7. A method of operation of a disc array apparatus having a presupposed response time for an access and including a plurality of disc units for storing data transmitted from a host apparatus, and an array controller for controlling upon an access from the host apparatus a data transfer between the disc units and the host apparatus, the method comprising:

identifying an access type of an access made from the host apparatus;

identifying a correction value for the response time value of the access according to the access type identified;

delaying an access end report of the access until a response time value corrected by this correction value is identified; and sending the access end report to the host apparatus at the presupposed response time of the disc array apparatus, by using the correction value.

8. A method of operation of a disc array apparatus as claimed in claim 7, wherein the access type is at least one of a sequential access for data read out from a continuous area of the disc unit and a non-sequential access for data read out from discontinuous areas of the disc unit.

9. A disc array apparatus having a presupposed response time for an access and including a plurality of disc units for storing data transmitted from a host apparatus and an array controller for controlling upon an access from the host apparatus a data transfer between the disc units and the host apparatus, the array controller comprising:

an access type identifier for identifying an access type made from the host apparatus;

a correction value identifier for identifying a correction value of a response time for the access according to the access type identified;

a response timing corrector for delaying an access end report until the response time corrected by this correction value is identified, wherein the delayed access end report for the access is sent to the host apparatus at the presupposed response time of the disc array apparatus, using the correction value.

10. A disc array apparatus as claimed in claim 9, wherein the access type identifier includes:

an address memory for storing an address of a preceding access;

an access continuity detector for deciding whether a current access is either a sequential access or a non-sequential random access using an address of a preceding access stored in the address memory;

a performance value detector for checking a performance value of the disc unit according to the access type identified by the access type identifier; and a correction value generator for generating a correction value for compensating a difference between a value obtained by the performance value detector and a predetermined reference value.

11. A disc array apparatus as claimed in claim 10, wherein the response timing corrector includes means for delaying a data transfer end report to the host apparatus until the response timing based on the correction value calculated by the correction value generator according to the access type identified by the access type identifier.

12. A disc array apparatus having a plurality of disc units for storing data transmitted from a host apparatus and an array controller for controlling upon an access from the host apparatus a data transfer between the disc units and the host apparatus, the array controller comprising:

an access type identifier for identifying an access type of an access made from the host apparatus, wherein the access type identifier includes:

an address memory for storing an address of a preceding access;

an access continuity detector for deciding whether a current access is either a sequential access or a non-sequential random access using an address of a preceding access stored in the address memory a performance value detector for checking a performance value of the disc unit according to the access type identified by the access type identifier; and a correction value generator for generating a correction value for compensating a difference between a value obtained by the performance value detector and a predetermined reference value;

a correction value identifier for identifying a correction value of the response timing for the access according to the access type identified; and a response timing corrector for delaying a response end report for the access until a response timing corrected by this correction value is identified.

13. A disc array apparatus as claimed in claim 12, wherein the response timing corrector delays a data transfer end report to the host apparatus until the response timing based on the correction value calculated by the correction value generator is identified according to the access type identified by the access type identifier.

* * * * *